United States Patent

Wang

[11] Patent Number: 5,889,575
[45] Date of Patent: Mar. 30, 1999

[54] EYEGLASS TEMPLE DEVICE

[76] Inventor: Chao-Cheng Wang, 58, Ma Yuan West St., Taichung, Taiwan

[21] Appl. No.: 933,614

[22] Filed: Aug. 28, 1997

[51] Int. Cl.$^6$ ................ G02C 5/16; G02C 5/00
[52] U.S. Cl. ................ 351/113; 351/153; 16/228
[58] Field of Search .................. 351/153, 121, 351/119, 113; 16/228

[56] References Cited

U.S. PATENT DOCUMENTS

| | | | |
|---|---|---|---|
| 5,402,552 | 4/1995 | Chen | 351/153 |
| 5,406,339 | 4/1995 | Chen | 351/153 |

Primary Examiner—Huy Mai

[57] ABSTRACT

An eyeglasses temple device has a temple and a pivot connector. The temple has a recess hole, a groove, and an extended plate. The pivot connector has a connecting device, an extended rod, and a spring. The connecting device has a hollow plate, a hollow lobe disposed on a first end of the hollow plate, a slot formed in the hollow plate, and a hole formed on a second end of the hollow plate. The extended rod has a cap end and a threaded end. The extended rod passes through the hole. The cap end is inserted in the slot. The threaded end is inserted in the groove. The spring surrounds the extended rod and is inserted in the slot. The hollow plate is inserted in the recess hole. A frame has two lugs, a notch, and a through hole. The hollow lobe is inserted in the notch. A bolt passes through the through hole to fasten the frame and the connecting device together.

2 Claims, 3 Drawing Sheets

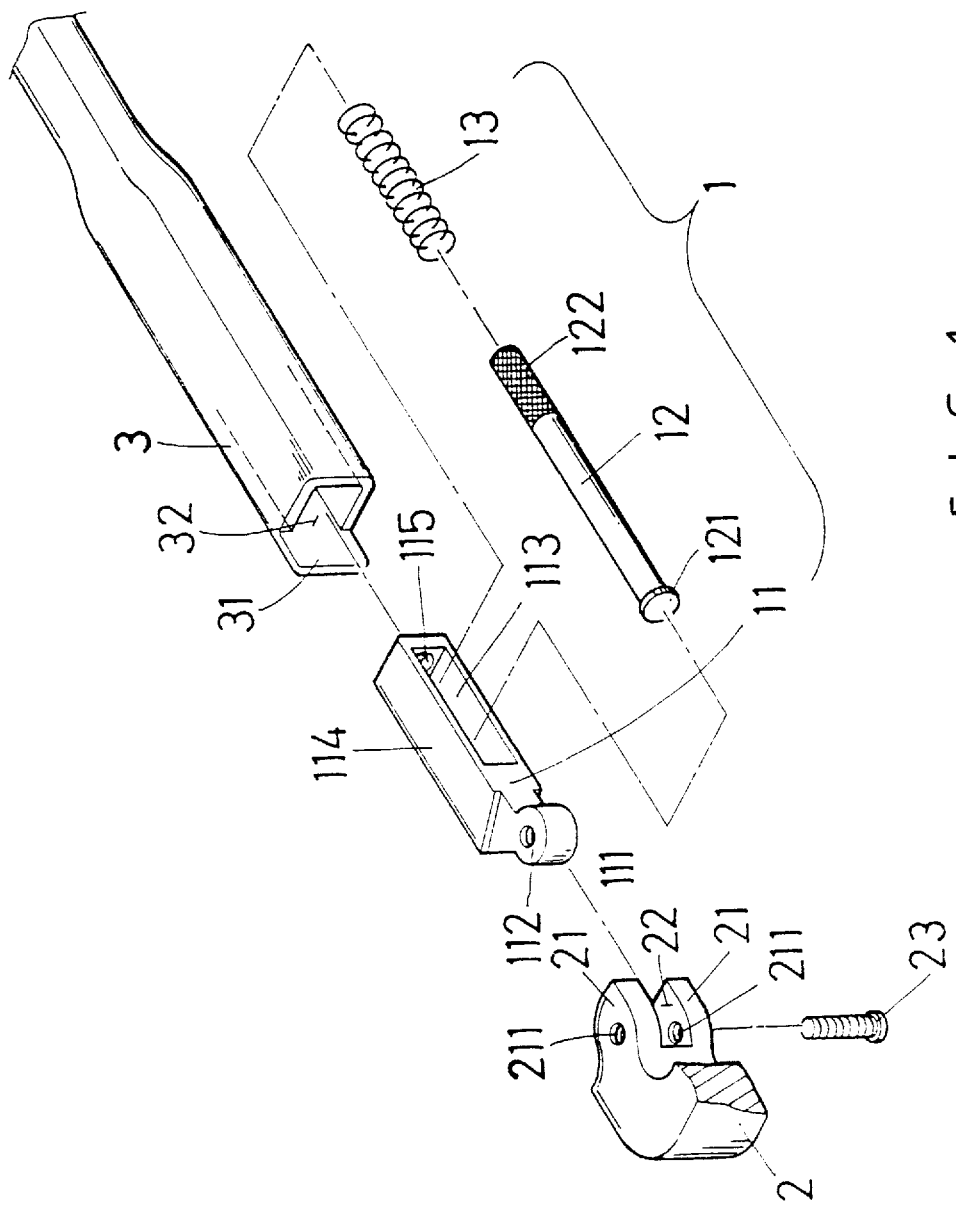
F I G. 1

EYEGLASS TEMPLE DEVICE

BACKGROUND OF THE INVENTION

The present invention relates to an eyeglasses temple device. More particularly, the present invention relates to an eyeglasses temple device which is easily assembled.

Most conventional temples of the spectacles have pivot connectors between the temples and the frames. However, the pivot connectors are often broken or worn out after a long period of usage.

SUMMARY OF THE INVENTION

An object of the present invention is to provide an eyeglasses temple device which is easily assembled.

Accordingly, an eyeglasses temple device comprises a temple and a pivot connector inserted in the temple. The temple has a recess hole, a groove communicating with the recess hole, and an extended plate. The pivot connector has a connecting device, an extended rod, and an elastic element. The connecting device has a hollow plate, a hollow lobe disposed on a first end of the hollow plate, a slot formed in the hollow plate, and a hole formed on a second end of the hollow plate. The extended rod has a cap end and a threaded end. The extended rod passes through the hole. The cap end is inserted in the slot. The threaded end is inserted in the groove. The elastic element surrounds the extended rod and is inserted in the slot. The hollow plate is inserted in the recess hole.

BRIEF DESCRIPTION OF THE DRAWINGS

FIG. 1 is a perspective exploded view of an eyeglasses temple device;

DETAILED DESCRIPTION OF THE INVENTION

Figure 2:
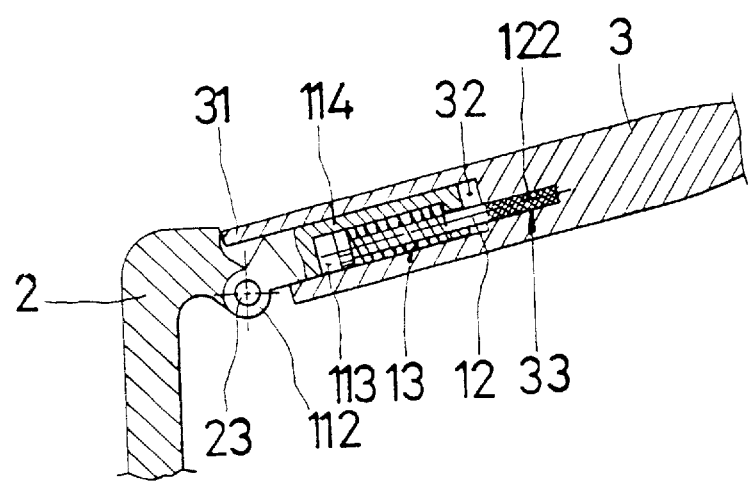
FIG. 2 is a sectional assembly view of FIG. 1.
Figure 3:
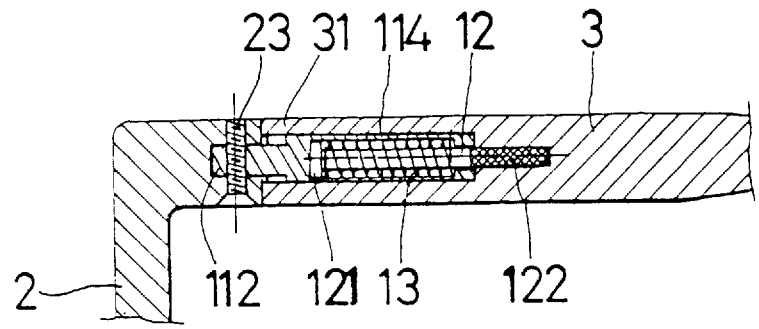
FIG. 3 is another sectional assembly view of FIG. 1.

Referring to FIGS. 1 to 3, an eyeglasses temple device comprises a temple 3 and a pivot connector 1 inserted in the temple 3. The temple 3 has a recess hole 32, a groove 33 communicating with the recess hole 32, and an extended plate 31. The pivot connector 1 has a connecting device 11, an extended rod 12, and an elastic element such as a spring 13. The connecting device 11 has a hollow plate 114, a hollow lobe 112 disposed on a first end of the hollow plate 114, a slot 113 formed in the hollow plate 114, and a hole 115 formed on a second end of the hollow plate 114. The extended rod 12 has a cap end 121 and a threaded end 122. The extended rod 12 passes through the hole 115. The cap end 121 is inserted in the slot 113. The threaded end 122 is inserted in the groove 33. The spring 13 surrounds the extended rod 12 and is inserted in the slot 113. The hollow plate 114 is inserted in the recess hole 32.

A frame 2 has two lugs 21 defining a notch 22, and a through hole 211. The hollow lobe 112 is inserted in the notch 22. A fastening element such as a bolt 23 passes through the through hole 211 to fasten the frame 2 and the connecting device 11 together.

Figure 4:
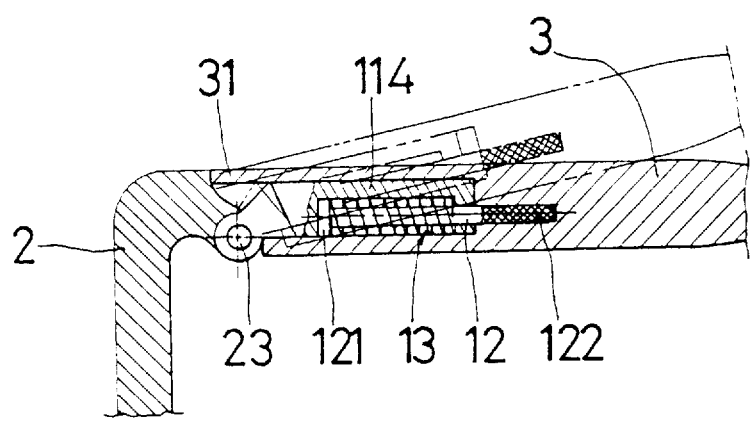
FIG. 4 is a schematic sectional view illustrating an operation of an eyeglasses temple device.

Referring to FIG. 4, the temple 3 can be rotated. When the temple 3 is rotated, the cap end 121 forces the spring 13 to be compressed.

The present invention has the following advantages. The slot 113 can confine the spring 13 therein. Therefore, the spring 13 will not be torsioned.

The invention is not limited to the above embodiment but various modification thereof may be made. Further, various changes in form and detail may be made without departing from the scope of the invention.

I claim:

1. An eyeglass temple device comprises:
   a temple and a pivot connector inserted in the temple,
   the temple having a recess hole, a groove communicating with the recess hole, and an extended plate,
   the pivot connector having a connecting device, an extended rod, and an elastic element,
   the connecting device having a hollow plate, a hollow lobe disposed on a first end of the hollow plate, a slot formed in the hollow plate, and a hole formed on a second end of the hollow plate,
   the extended rod having a cap end and a threaded end,
   the extended rod passing through the hole on the second end of the hollow plate,
   the cap end inserted in the slot,
   the threaded end inserted in the groove,
   the elastic element surrounding the extended rod and inserted in the slot, and
   the hollow plate inserted in the recess hole.

2. An eyeglass temple device as claimed in claim 1, wherein the elastic element is a spring.

\* \* \* \* \*